(12) United States Patent
Simmons

(10) Patent No.: US 10,387,826 B2
(45) Date of Patent: Aug. 20, 2019

(54) VEHICLE INVENTORY AND CUSTOMER RELATION MANAGEMENT SYSTEM AND METHOD

(71) Applicant: DEI Headquarters, Inc., Vista, CA (US)

(72) Inventor: Michael S. Simmons, Costa Mesa, CA (US)

(73) Assignee: DIRECTED, LLC, Vista, CA (US)

( * ) Notice: Subject to any disclaimer, the term of this patent is extended or adjusted under 35 U.S.C. 154(b) by 204 days.

(21) Appl. No.: 14/148,725

(22) Filed: Jan. 7, 2014

(65) Prior Publication Data

US 2015/0193726 A1 Jul. 9, 2015

Related U.S. Application Data

(60) Provisional application No. 61/749,369, filed on Jan. 6, 2013.

(51) Int. Cl.
*G06Q 10/08* (2012.01)
*G07C 9/00* (2006.01)
*B60R 25/20* (2013.01)

(52) U.S. Cl.
CPC ....... *G06Q 10/087* (2013.01); *G07C 9/00103* (2013.01); *B60R 25/2018* (2013.01)

(58) Field of Classification Search
CPC .... G06Q 10/00; G06Q 20/203; G06Q 20/382; G06Q 10/06–08; G06Q 30/02; G06F 19/00; G06F 7/02; B60R 25/00–04; B60R 25/045; B60R 25/302; B60R 25/23; B60R 25/04; B60R 2325/105; H04L 63/0823

USPC ...... 705/7.12, 28, 64, 14.64; 701/29.3, 31.4, 701/31.5, 1; 340/5.64, 5.72, 5.73, 5.21
See application file for complete search history.

(56) References Cited

U.S. PATENT DOCUMENTS

| | | | | |
|---|---|---|---|---|
| 2003/0225707 | A1* | 12/2003 | Ehrman | G06Q 10/08 705/64 |
| 2004/0150508 | A1* | 8/2004 | Mosgrove | B60R 25/23 340/5.21 |
| 2004/0160304 | A1* | 8/2004 | Mosgrove | B60R 25/23 340/5.21 |
| 2004/0185842 | A1* | 9/2004 | Spaur | B60R 25/04 455/420 |
| 2005/0060070 | A1* | 3/2005 | Kapolka | G06Q 10/08 701/31.4 |
| 2005/0065678 | A1* | 3/2005 | Smith | G06Q 10/00 701/31.4 |

(Continued)

*Primary Examiner* — Olusegun Goyea
(74) *Attorney, Agent, or Firm* — Anatoly S. Weiser, Esq.; IPLCounsel.com

(57) ABSTRACT

In one embodiment of the present invention, provided is a system and methods for managing vehicles on a car dealer lot and for customer relation management after the time of sale of the vehicle, the system having a first mode, where the system tracks the location of vehicles on the dealer's lot so that vehicles can be easily found by make, model, trim level, price and other distinguishing vehicle features, the system further providing vehicle access authorization and reporting of any access or status change to the vehicle. In a second mode, data is collected from the vehicle data bus network regarding vehicle performance, driving behavior, history, and similar parameters and is analyzed and packaged so it may be usefully be communicated to the vehicle owner or others.

18 Claims, 7 Drawing Sheets

(56) References Cited

U.S. PATENT DOCUMENTS

| | | | |
|---|---|---|---|
| 2005/0165639 A1* | 7/2005 | Ross | G06F 16/9535 705/14.64 |
| 2006/0229780 A1* | 10/2006 | Underdahl | B60R 25/00 701/29.3 |
| 2007/0109094 A1* | 5/2007 | Sahai | B60R 25/04 340/5.72 |
| 2008/0015955 A1* | 1/2008 | Ehrman | G06Q 10/06 705/28 |
| 2008/0316006 A1* | 12/2008 | Bauman | G07C 5/008 340/425.5 |
| 2009/0302999 A1* | 12/2009 | Skertic | B60R 25/04 340/5.64 |
| 2012/0030470 A1* | 2/2012 | Jdanov | H04L 63/0823 713/176 |
| 2013/0054287 A1* | 2/2013 | Rivera | G06Q 10/06314 705/7.12 |
| 2014/0200760 A1* | 7/2014 | Kaufmann | G07C 5/008 701/29.3 |

* cited by examiner

VEHICLE INVENTORY AND CUSTOMER RELATION MANAGEMENT SYSTEM AND METHOD

CROSS-REFERENCE TO RELATED APPLICATIONS

This application claims priority to U.S. provisional application No. 61/749,369 filed Jan. 6, 2013, titled VEHICLE INVENTORY AND CUSTOMER RELATION MANAGEMENT SYSTEM AND METHOD.

BACKGROUND OF THE INVENTION

1. Field of the Invention

The present invention is in the technical field of new car dealer vehicle inventory and customer relationship management systems and methods therefor. More particularly, the present invention is an inventory asset management system for vehicles on car dealer vehicle lots. The system is capable of providing central monitoring, vehicle access control, reporting on vehicle location on the lot, vehicle condition status, and other parameters of each asset on a car dealer's lot. The system is further capable of wireless communication between the vehicles and the central system module. When in dealer mode, communications may be provided at the vehicle to sales staff prior to sale. After the sale, when in owner mode, specific communications can be delivered to vehicle owner based on vehicle conditions and user preferences. Communications can be provided to individuals or group vehicle purchasers after the sale.

2. Discussion of the Art

Car dealers have a constant stream of new and used vehicles that enter and leave the Dealer's vehicle lot as vehicles are purchased from the factory and then resold to purchasers that trade in their old vehicle. There are often many different individuals that may need or have access to the vehicles or the who have access to the vehicle's keys, including people such as sales and lot staff, and aftermarket parts installers. It is generally difficult and sometimes impossible to monitor or control those that have access to the vehicle. This creates significant security concerns for the dealership.

Additionally, it is desirable for new car dealers to maintain a continuing relationship with the vehicle purchaser. Dealers may wish to make customers aware of vehicle maintenance schedules and maintenance services the dealer offers. The dealer may also want to provide customers, in an efficient and convenient manner, with information regarding factory recalls and recall action procedures. Generally, dealers will provide purchasers with postal or email notifications of information. These methods are mass mailed to a large customer list and do not provide for individualized messages that are customized for specific recipients. Further, these messages do not allow for the use of specific information gathered from the specific vehicle in real time to customize messages.

As vehicle technology has evolved to use digital vehicle data bus systems to monitor and control vehicle systems and devices, aftermarket manufacturers have developed systems to read digital signals from and send data messages to various vehicle devices connected to the data bus. Aftermarket systems have included GPS and cellular phone modules that allow for location and tracking capability and for communication with the vehicle through cellular phone networks. Adding a GPS and or cellular phone module creates significant cost increases in remote monitoring and control systems for vehicles. Not only is there increased hardware cost during manufacturing, but also cell phone transceivers require a subscription to provide access to a network for communication services.

The connection to the vehicle's data bus has generally been made through connection through the OBDII port or by hard wiring a data line to the data bus network. With the ability to remotely communicate messages to devices connected to a vehicle's data bus system there is an opportunity to remotely select features of those devices or set device operating parameters. New car dealers can exploit this capability and offer, at the point of sale, functional upgrades to purchasers. For example, a buyer may wish to have remote start capability for the vehicle. By turning this option on in the vehicle through the data bus the dealer can upgrade the sale. A limitation to current systems is that the vehicle must be programmed at the factory or connected to a programmer that is factory controlled.

Vehicle owners currently use remote fobs to control and program a number of devices on a vehicle data bus system. Additionally, most vehicles still require a physical key to access the car and start the vehicle. Vehicle owners prefer to have keys and other access and control devices integrated into a single device. Some vehicles, such as push to start ignition vehicles, allow for proximity detection of the key and with proper authorization, start of the vehicle engine with a simple push of a button on the dashboard. These systems still require the driver to have a separate key or transponder.

As vehicle data is gathered by way of the vehicles data bus system, access by the vehicle owner or driver to this information can be very useful. It is known to capture vehicle data and store the data to an on-board memory and then transfer the data to a reader or similar computer attached to the data bus. Vehicle malfunction, diagnostics and crash data are examples. There are limitations with the current data transfer methods in that these methods may require connection of a special tool to read the data. Further the data is not real time, it must be extracted from memory.

SUMMARY OF THE INVENTION

In one embodiment of the present invention, provided is a system and methods for the management of vehicles on a car dealer lot and for customer relation management after the time of sale of the vehicle. In a first mode, the system tracks the location of vehicles on the dealer's lot when the vehicle is taken into inventory so that the vehicle can be easily found. Sales staff can find vehicles by make, model, trim level, price and other distinguishing identifiers or features of the vehicle. The system allows the dealership's management staff to set vehicle access authorization to vehicles for individual employees and provides reporting of any access or status change to the vehicle. The system provides a communication link from a central office to the vehicles data bus network to allow dealers to configure selected functions and features of the vehicle at the point of sale.

After the sale, the in-vehicle module is permanently disabled from functioning in the first mode to prevent dealer access or modification to the vehicle post sale. In a second mode, data is collected from the vehicle data bus network regarding vehicle performance, driving behavior and history, and similar parameters. This data is analyzed and packaged and may be communicated to the consumer or others. The in-vehicle module may send data to or receive messages from a wireless connection through a hand held processor, such as a smart phone in the possession of the driver. The hand held processor may also communicate packaged data to the dealer node of the system through the drivers smart phone access to a cellular phone network.

Packaged data may be stored in the system central data base, which is in communication with the cellular communication network and accessible through the Internet. The system may automatically send predetermined messages to the vehicle owner's smart phone when the data package received matches specified criteria. For example, when the vehicle odometer reaches a specified odometer reading a message that maintenance is necessary may be issued. The message may also include an ad or coupon from the dealer related to maintenance services or offering a discount.

The vehicle owner may set up an account within the system through the smart phone or Internet to create a user preferences profile for the purpose of receiving desired notices regarding specified vehicle information or information related to products and services if they match the selected driver profile criteria. In one aspect of the invention, data may be shared with retailers or businesses. If the driver preferences matches pre-selected customer profile characteristic, the system may send retailer or business authorized driver specific messages to the drivers through the smart phone.

In one aspect of the invention, provided is a system that allows for the fast and efficient location on a dealer's lot of vehicles having features that meet desired product characteristics.

In another aspect of the invention, the system provides for simple and convenient means for monitoring those who access the vehicles on a car dealers lot and for providing different authorization levels for access based on the employees needs.

In yet another aspect of the invention, provided is an aftermarket system that allows for the use of factory data bus codes to select options and features of devices connected to the data bus system at the time of sale within the dealer's sales offices.

In another aspect of the invention, the dealer features of the system can be permanently disabled at the time of sale and the driver features activated.

In another aspect of the invention, the system provides an apparatus and method for conveniently and efficiently receiving and communicating data from a vehicle data bus system to a central server with driver's smart phone providing a communication link.

In yet another aspect of the invention, the system provides location and communication capability for a vehicles without the vehicle owner requiring a new subscription for telecom services.

In yet another aspect of the invention, the system allows car dealers to provide post sale services and messages to customer that are customized to vehicle conditions and customer preferences.

In another aspect of the invention, the system shares driver and vehicle information to businesses that may offer notifications and offers to drivers based on the received information.

In yet another aspect of the invention, the system provides concierge services to drivers when requested by the driver.

Finally, it is another aspect of the invention to allow for the elimination of a key or fob to gain access and control of vehicles and for the integration of these items into a cell phone that can be paired to a vehicle at the point of sale of the vehicle.

DESCRIPTION OF THE INVENTION

Example embodiments are described herein in the context of an vehicle inventory and customer relation management systems and methods. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiment as illustrated in the accompanying drawings. The same reference indicators will be used throughout the drawings and the following description to refer to the same or like items.

Figure 1:
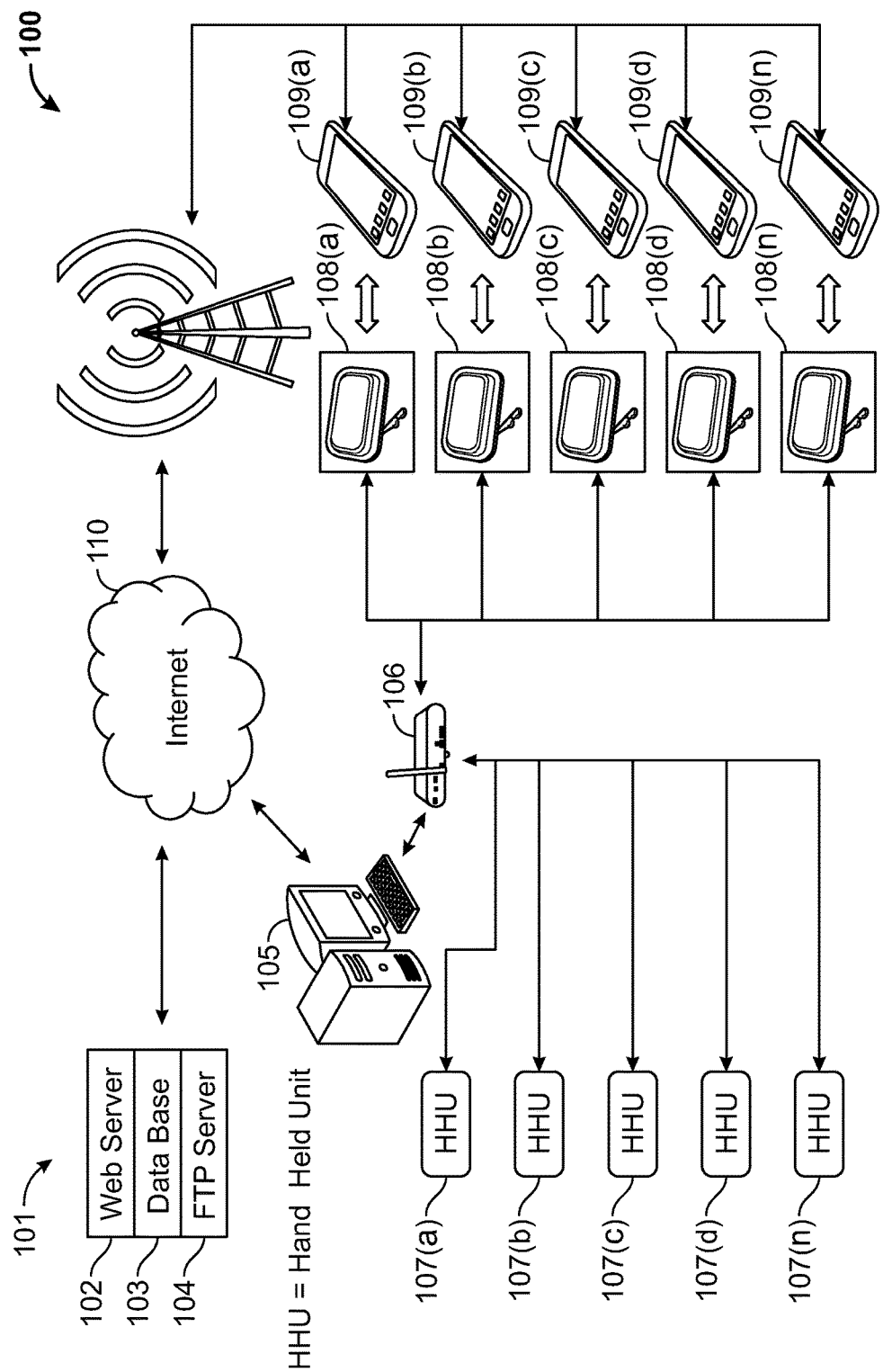
FIG. 1 is a schematic diagram showing the current invention.

Now with reference to the various Figures, FIG. 1 shows one embodiment of the invention 100. In disclosed embodiment, a central server 101 hosts a web server 102, an FTP server 104, and a data base server 103. The central server 101 is accessible through the Internet 110 and is in communication with a local computer 105 at the dealership lot. A wireless communication hub 106 is associated with the local computer 105 for providing a wireless communication link with a plurality of wireless hand held vehicle access devices 107 (a, b, c, d . . . n). The central communications hub is located remotely from the vehicles and is also in wireless communication with the plurality of in-vehicle modules 108 (a, b, c, d . . . n). The plurality of in-vehicle modules 108 (a . . . n) are interfaced with a vehicle data bus system (not shown).

The system central server 101 can be any know server application and hardware configuration and can be hosted locally, but is preferably at a location remote from the new car dealership. The server 101 can be accessed through any computer or smart phone that has access to the Internet 110. In this structure, multiple dealerships can be supported with a single web-based server. Each dealership sets up a unique dealership account within the server application, providing for sub-accounts for dealerships with multiple sub-dealerships within their organization or multiple vehicle lots.

The dealership account administrator can set passwords and multiple levels of permissions for allowing different levels of access and configuration authorities. The administrator can also assign hand held units 107 to specific individuals through the configuration process. Each hand held unit 107 is assigned, using a HHU identification number, which can be assigned to individual employees of the dealership. The account administrator can set permissions for each individual employee to grant full access, limited, or engine start access to a vehicle, or data bus reconfiguration permissions based on the needs of the user to access the vehicle or to access features of the data bus or system. A number of embodiments of the hand held units 107 are contemplated. The hand held units may configured as stand-alone or dedicated piece of hardware, where the unit is specifically built for the system and is assigned to a staff member who is responsible for the unit. In an alternative embodiment, the hand held units is a smart phone application that can be downloaded from the Internet and configured according to the users needs.

The dealership sets up an account in the system 100 by configuring the account within the web server 102 via the Internet 110. The dealership registers each of the plurality of in-vehicle units 108 (a . . . n) and each of the plurality of hand held units 107 (a . . . n) within the database 103. Each in-vehicle unit 108 record will have multiple data points to capture, including vehicle identification numbers, make, model, trim level, and other vehicle features. Additionally, data fields for information from the vehicle data bus are available within the data base for later capture after the sale.

Access to the central server 101 is achieved using a dealer interface application residing on the dealers local computer 105 and connected to the Internet 110. The connection can be wireless or hardwired and it is contemplated that access may be through a cell phone network or other known or similar satellite based communication system using a phone application.

The dealer interface computer 105, which can be any standard computer capable of connecting with the Internet, storing the interface application in memory, and processing the user interface application instructions is also in communication with a wireless communication hub 106. The hub includes a local radio frequency (RF) transceiver that provides for wireless two way communication with each of the hand held units 107 and each of the in-vehicle units 108 located within the RF range of the communication hub 106 or a relay point. The RF is a frequency authorized by appropriate government authorities, such as the Federal Communication Commission, and power output is limited so that the RF emission of each device does not interfere with similar devices operating on the same frequency beyond the vehicle lot. It is contemplated that each of the hand held units 107 and in-vehicle units 108 may have a RF relay capability whereby the RF signal of the most distant device is relayed to the next most proximate device continuing to relay across units until the signal reaches the hub 106. The hub 106 communicates with the in-vehicle modules 108 and the hand held units 107 after performing a handshake routine that identifies and authenticates that the unit as registered on the system. Communications between the hub 106 and the in-vehicle 108 and hand held units 107 are encrypted to prevent unauthorized access to vehicles.

Figure 2:
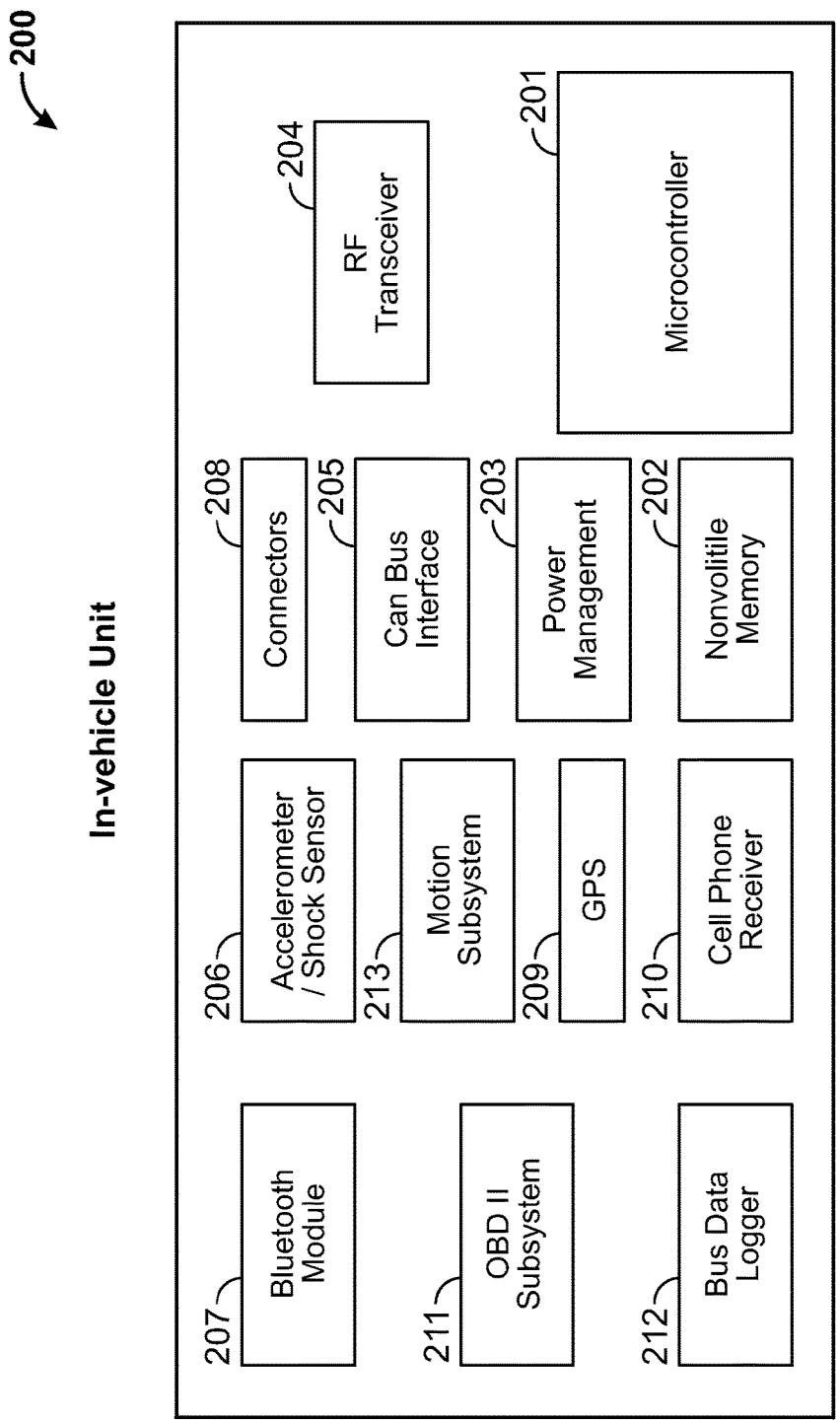
FIG. 2 is a block diagram showing components of the in-vehicle module.

Now with reference to FIGS. 1 and 2, the in-vehicle module 200 is comprised of a micro-processor 201, non-volatile memory 202, a power management subsystem 203, an RF transceiver 204, a data bus interface 205, an accelerometer/a shock sensor 206, a Bluetooth® enabled transceiver 207, and connectors 208 for connection with the vehicles OBDII port. In some embodiments a GPS engine 209 and cell phone transceiver 210 may also be included. An OBD II subsystem may be employed in some embodiments to provide additional processing of data from the vehicles data bus system and for logging vehicle status and driving events in a data bus logger memory 212. It will be appreciated by one skilled in the art that these components may be engineered and constructed in a variety of known configurations.

The in-vehicle module 200 can be configured in a first "dealer" mode when the vehicle is in the dealer's inventory and operated on the dealers lot, or in a second "driver's" mode after the sale of the vehicle to the consumer, where the dealer mode is disabled. The in-vehicle module 200 is preferably connected to the vehicles data bus system through the OBDII port. The module 200 may consistently monitor, periodically query or query upon triggering of a preselected event the data bus for vehicle parameters via protocols of OBDII. Upon receipt by the module 200 of data from the vehicle data bus, the data is analyzed by the OBD II subsystem 211 where the data may be packaged and periodically transmits the data to the hub 106 via the RF transceiver 204. The packaged data may be transferred to the central database 103 via the local computer 105 when in dealer mode, or to an associated cellular phone via the Bluetooth® connection when in driver mode post sale, as discussed later. The data received from the data bus includes immediate status parameters, such as door open/closed status, door locked/unlocked status, phone docked status, engine RPM, vehicle speed, odometer reading, throttle position, gear box position, etc. Any data transmitted on the data bus is conceivably accessible for monitoring. Static information such as VIN is received along with transient information such as DTC codes, airbag deployment, etc. The in-vehicle module 200 will also query and monitor for the car battery level and acquire vehicle acceleration in 3 mutually orthogonal directions. Packaged data may be passed to the bus data logger 212 for later recovery and use.

Figure 3:
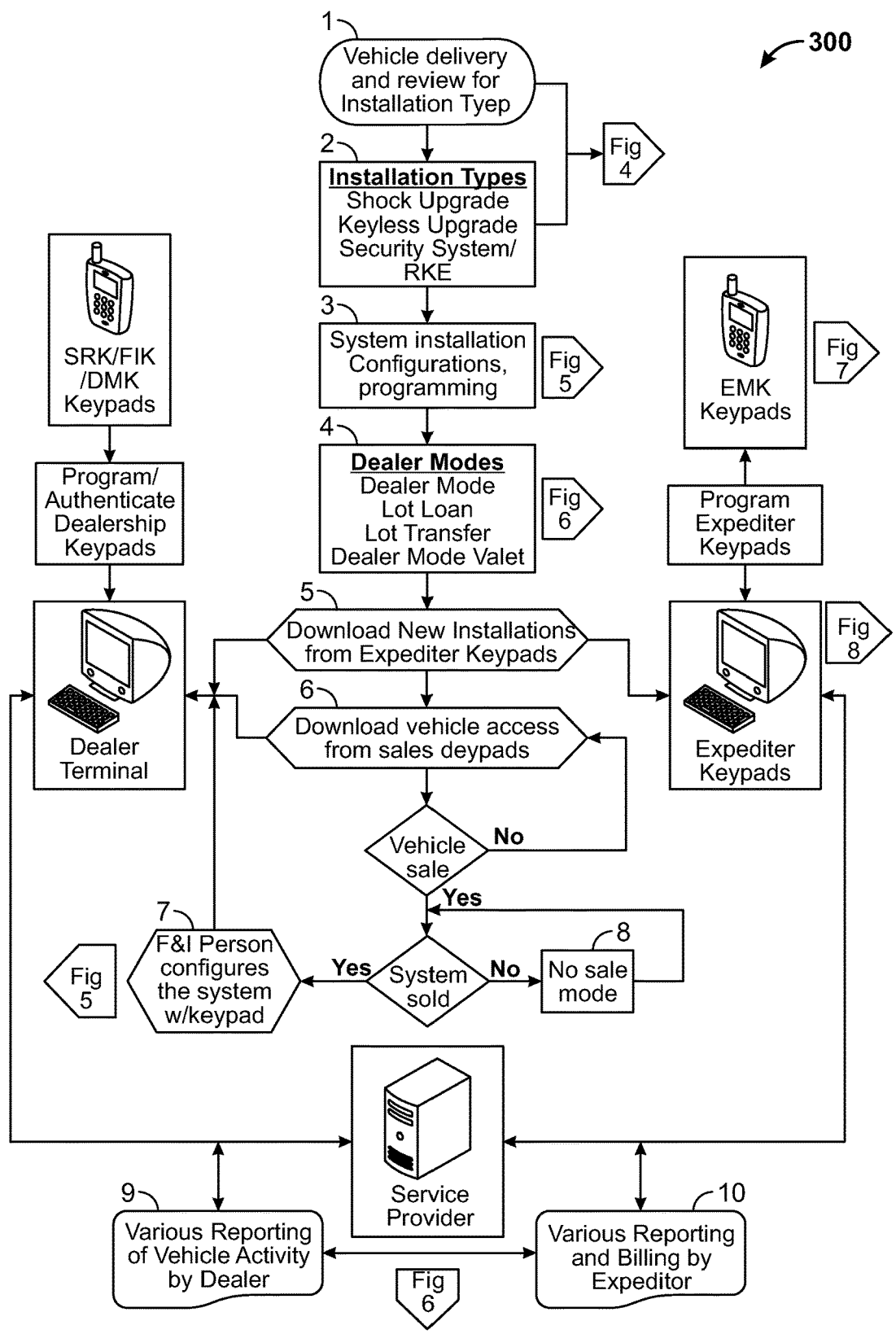
FIG. 3 is a flow diagram of one embodiment of the high level routine for executing the method of taking a vehicle into the dealer's inventory and using the system.
Figure 4:
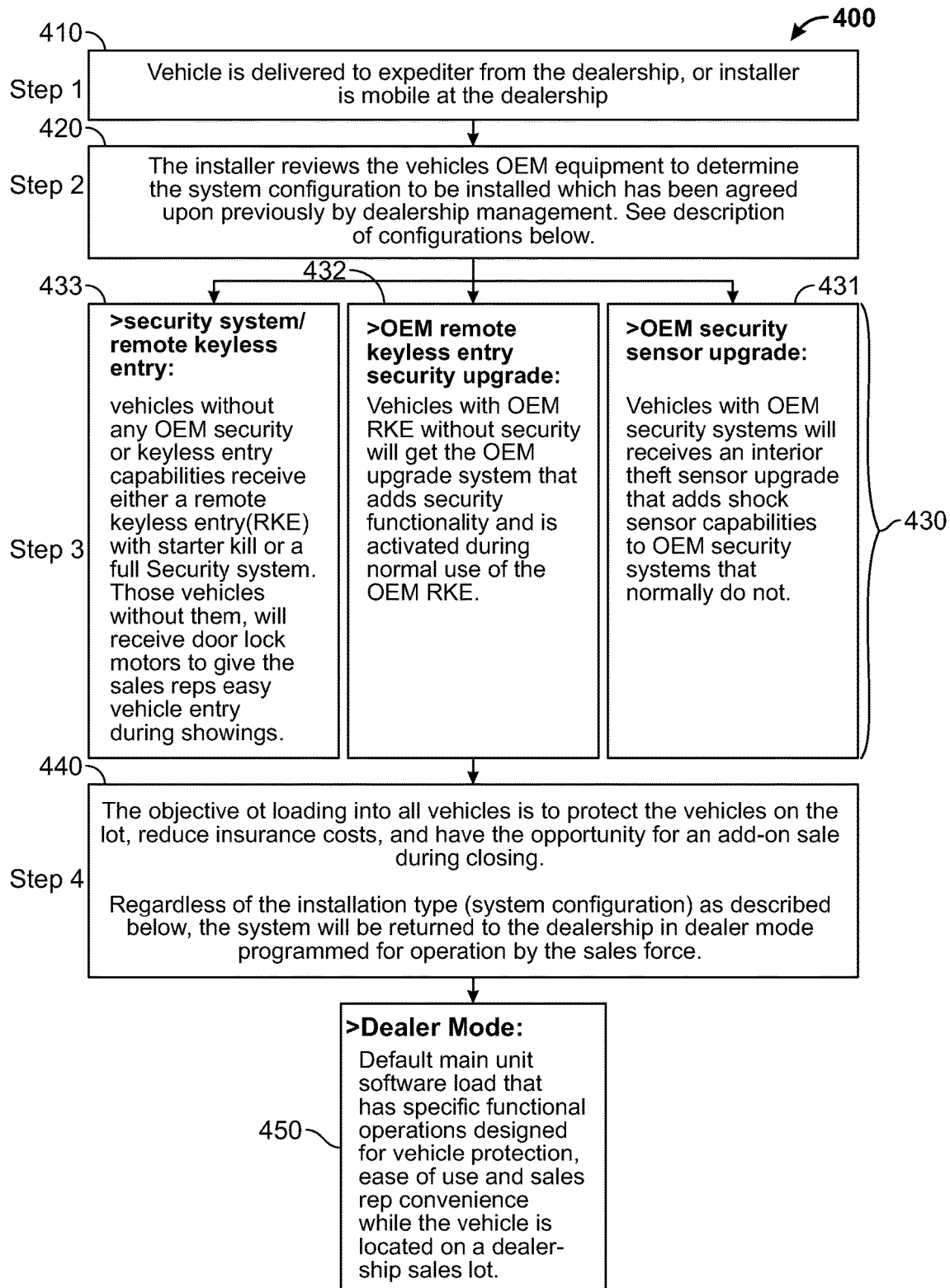
FIG. 4 is a flow diagram showing the method and logic of one embodiment of the subroutine for determining the upgrade installation configuration method of the current invention.

Now with reference to FIG. 1-6. FIGS. 3-6 disclose one embodiment of a method 300 of taking a vehicle into the dealer's inventory and using the system 100. FIG. 3 describes the high level routine and FIGS. 4-6 each describe details of the indicated subroutines. At step one in FIG. 3, the vehicle is received by the dealer and inspected for make, model, trim level, color, features and other aspects of the condition of the vehicle. After the acceptance into inventory, the subroutine disclosed in FIG. 4 400. Similarly, At step one of FIG. 4, a determination regarding the type vehicle information is made. At step two 420 the aftermarket installer reviews the dealer order for aftermarket upgrades to be installed on the vehicle. FIG. 4 at step three 430 discloses three type of aftermarket security features that can be configured. However, it will be appreciated by one skilled in the art that any feature sets for devices on the data bus can be selected through this process. In one alternative embodiment, a remote start function could be selected. At step three in FIG. 4 a selection is made between a remote keyless entry and entry level security system 433. At 432 an OEM an upgraded security and keyless entry system is selected, and at 431 a security system with sensors is selected.

Figure 5:
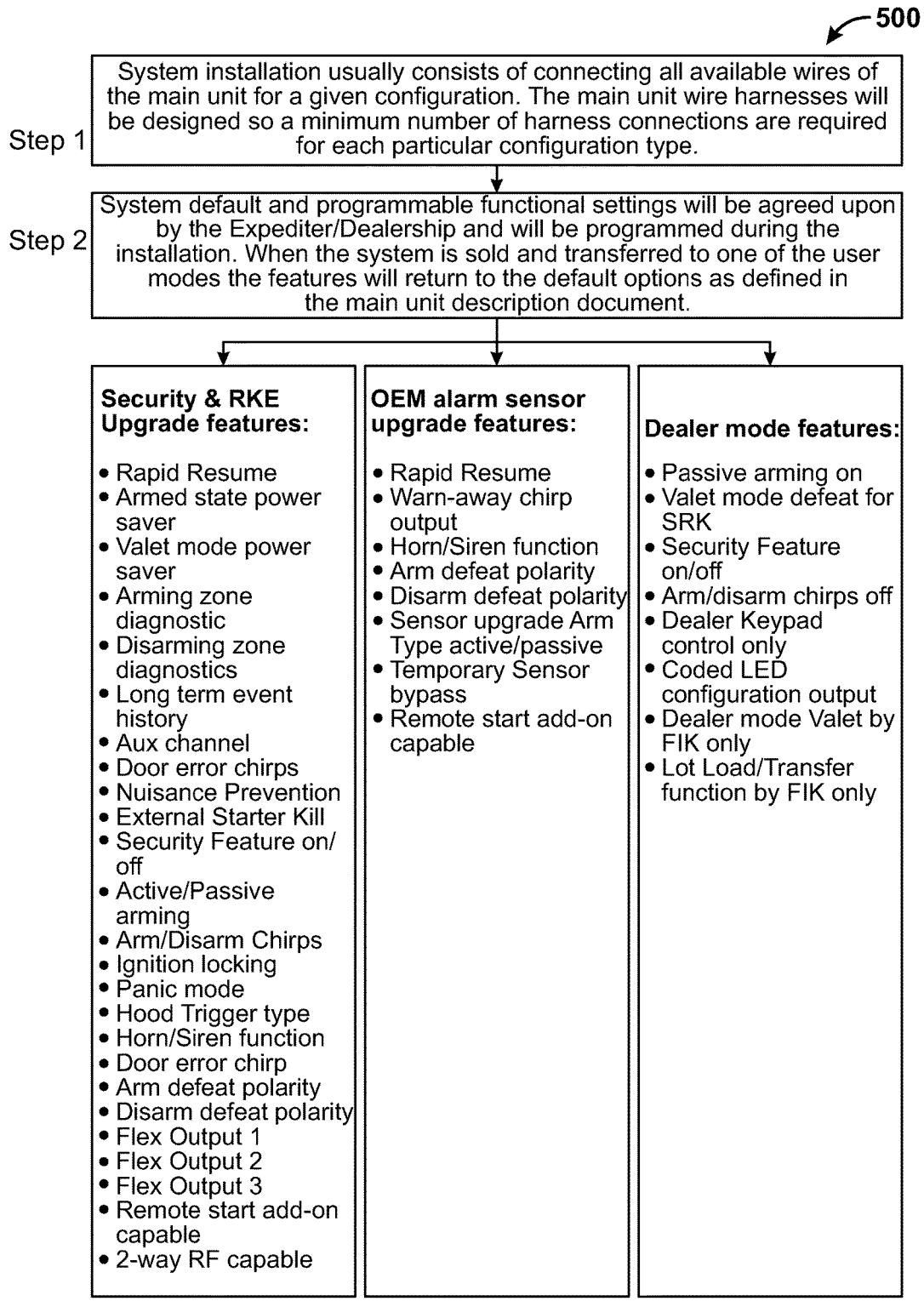
FIG. 5 is a flow diagram showing one embodiment of the installation and programming subroutine for functions and features of installed upgrades according to the current invention.

As disclosed in FIG. 3 step three, and FIG. 5, the security system is then installed in the vehicle and configured. FIG. 5 shows a simplified process 500 of installation for the various security types. At step 1 of FIG. 5, the hardware for the security system is installed. At step 2 of FIG. 5, the configuration of the security system according to the selected feature is completed. At step three in FIG. 3, step four in FIG. 4, and step two of FIG. 5, the in-vehicle module 107 has been installed into the vehicle by connection to the OBD II port of the vehicle and all security system upgrades have been made. Now, at step four of FIG. 3, the module 107 is placed in dealer mode and configured to send a receive messages from the communications hub 106. The dealer then determines the proper placement of the vehicle on the dealer lot.

Figure 6:
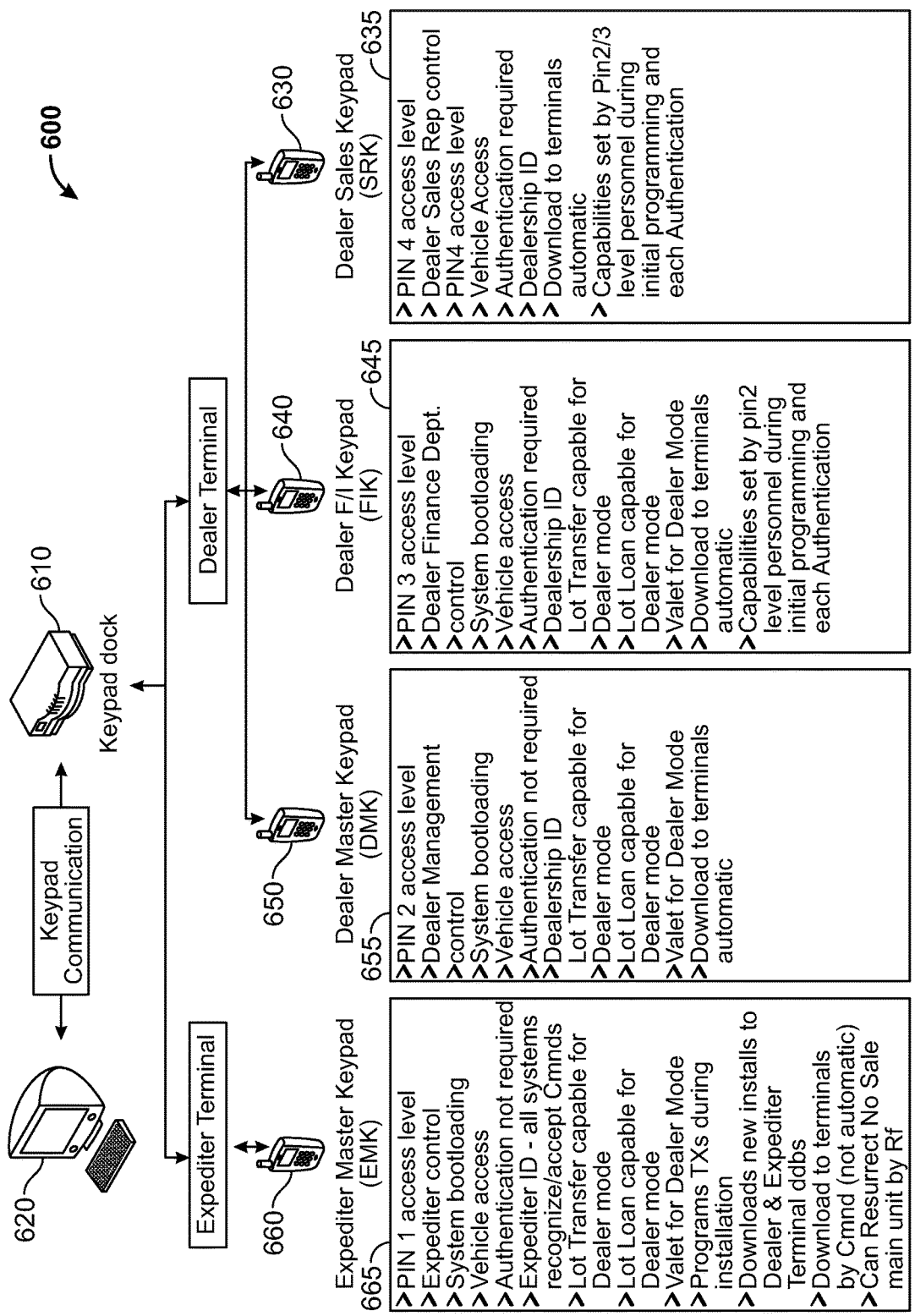
FIG. 6 is a flow diagram showing of one embodiment of the structure of user operations of the functions and features of installed upgrades according to the current invention.

The in-vehicle module 108 is initially configured in the dealer mode, which allows access to the vehicle by the hand held units 107 that were previously configured into the system 100 by the dealer administrator. FIG. 6. demonstrates one embodiment 600 of how access authorization may be configured where a plurality of hand held units 630, 640, 650, 660 may be docked into a cradle 610 for storage when not in use or when being configured. Configuration can be performed using the software residing on the local computer 620. After completion of the configuration, the configuration instructions are wirelessly communicated to the dock 610 where the instructions are transferred to the plurality of hand held units 630, 640, 650, 660. Each hand held unit may be configured to provide different vehicle access authorizations. For example, expediter master unit 660 will be authorized for access and control of the features described in box 665. A dealer master unit 650 will be authorized for those function and features described in box 655. A stander dealer unit 640 will be authorized for those functions and features described in box 635. Thus, a variety of authorizations and permissions are established during configuration.

Figure 7:
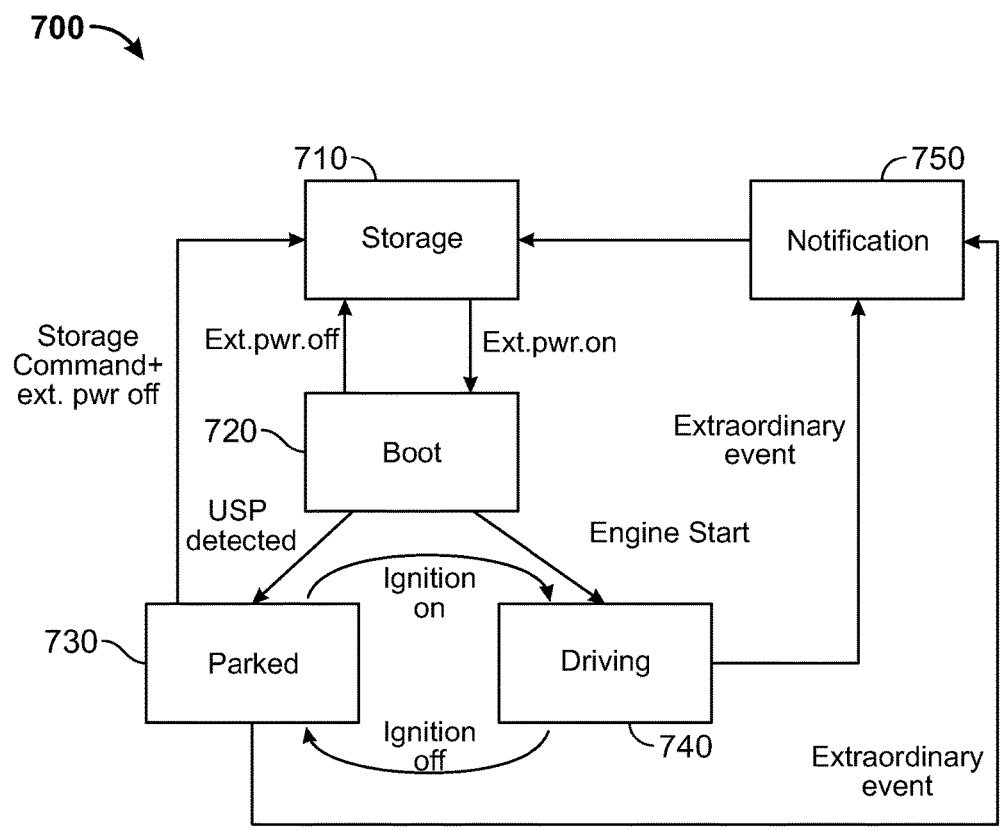
FIG. 7 is a flow diagram demonstrating one embodiment of the transition from various states of the current invention.

The in-vehicle units will have various software states including a storage state, a boot state, dealer mode and an owner mode. FIG. 7 demonstrates the transitions from the various states 700. The storage state 710 is the default dormant state. The in-vehicle module will eventually (there may be some transitions to short lived states before the storage state) end up in this state when the unit is not connected to data bus or the car battery is removed. In the storage state 710 internal power supply is disconnected from the rest of the circuitry, thus no power drain occurs. Transition from the storage state 710 is to boot state 720, which occurs upon on detection of the external power source by the power management subsystem 203.

The boot state 720 is the natural follower of the storage state 710. The in-vehicle module 200 will remain in the boot state 720 until the external power is disconnected, prompting the transition to the storage state 710 or the configuration of the unit is completed. The in-vehicle module configuration is complete and verified when engine start is detected, prompting the transition to one of two operating state parked 730 or driving 740. To detect the engine start or the connection to the data bus, the in-vehicle module 200 requires some information to trigger the start routine, e.g. Bluetooth® pairing info, VIN, etc. Until this info is acquired, the device will stay in the boot state 720, thus the entire configuration happens within the boot state 720. Any invalidation of the in-vehicle module configuration will force transition to the boot state 720.

When in the dealer mode, are a number of users set up within the dealers account that can be configured through the local computer 105 application or by accessing the central server 101 using a web browser. The dealer users are set up in a boot mode 720 where the administrator will assign hand held units 107 to sales staff and other users. The administrator may authorize third party installers that provide aftermarket features to the vehicle. Authorized access can be limited by time of access, amount of access, type of access or similar restrictions. After completion of the configuration, the module enters operating mode parked 730 or driving 740. The operating modes can be access when in dealer mode or in driver mode. The in-vehicle unit will default to dealer mode and remain in dealer mode until the unit is reconfigured to driver mode and the dealer mode is permanently disabled.

When in dealer mode, an authorized user with hand held unit transmits an authorized identification code. When in Bluetooth proximity of the vehicle, the user can operate the functions that the administrator has pre-authorized for the user. For example, if the use is a sales staff, the user may be able to unlock the vehicle doors and start the ignition. Additional authorization by be required to test drive the vehicle. If authorization is not provide, the in-vehicle module will allow starting the engine, however, it the vehicle transmission is put in drive, a stop engine signal will be transmitted and the driver will not be able to drive the vehicle. If the authorized user is an aftermarket installer of accessories, the authorized user may only gain access to the vehicle without any authorization to start the engine or drive the vehicle. If the authorized user is the finance and insurance officer of the dealership, he may be authorized to select specified feature upgrades for the vehicle at the local computer 105 and the instructions to set selected features will be transmitted by the hub 106 to the in-vehicle module 200, which send to the data bus the instructions to activate the specified feature.

While in dealer operating mode, the in-vehicle unit 107 receives and sends encrypted messages to and from the communication hub 106. Data transferred from the vehicle to the hub 106 is further transferred using conventional data transfer techniques to the data base 103 and made available for data processing and reporting through the dealer interface at the local computer 105. For in-vehicle units 108 with a GPS or where the vehicle itself contains a GPS capability, location data is transferred to the hub 106, allowing dealers to know the location of every vehicle on the lot. For vehicles without GPS capability, the dealer can simply input the space location on the lot of the vehicle or use the hand held unit 107 to capture GPS coordinates of the vehicle. Sensors may be set up around the dealer lot to allow use of the hand held units to triangulate the location of vehicles. Using the hand held unit locator method; the hand held unit queries the in-vehicle unit when in Bluetooth® proximity to the vehicle. After confirmation of the VIN, GPS coordinates of the hand held unit 107 are transferred to the hub via the hub transceiver.

The dealer can use the function and feature descriptions or other vehicle preference descriptions provided by the purchaser to easily locate vehicles on the lot that meet the specified customer criteria. The sales staff enters the customer preferences into the hand held unit or dealer interface and the data base is queried. A list of vehicles matching the criteria and their locations on the lot are presented through the interface. For hand held units 107 that are granted permission to access to the vehicle, the type of access performed, the time, and the duration of access is recorded each time access occurs. The access data is captured on the in-vehicle unit 108 memory and hand held unit 107 and transferred to the database 103 via the hub 106. The system administrator can also program trim levels changes and vehicle features from the user interface. For example, the remote start feature discussed above, or a "pay-to-play" type vehicle loan control programs where, if the purchaser is late on a loan payment, the system will provide late payment notifications and ultimately vehicle disable. This remote feature programming can be used for essentially any vehicle function or feature.

Another feature of the in-vehicle unit 108 is that it functions as an interface between the vehicle data bus system and an authorized cell phone paired to the unit. This allows the user to access vehicle diagnostic codes, clear error codes and provide data to the dealership for repair and maintenance. The users' smart phones are used as hosts of a dedicated app and as a source of GPS information. The app provides user authentication, active communication with the in-vehicle module for user initiated commands. The phone can be used as a source of the GPS information provided on the regular basis to the in-vehicle module and as a communications link for routing information from the in-vehicle unit to the database.

In the owner mode, all dealer mode functions are disabled to ensure that no access to the vehicle can be had after the sale and transfer to the purchaser. In the owner mode, the in-vehicle unit is paired to the cell phone of the vehicle owner using the local Bluetooth® capability. The user's phone number is programmed into the database to allow communication with the system via the cell phone network. The smart phone includes a smart phone application that is associated with the vehicle, dealer, user and other records associated with the new car purchaser. The smart phone application can be customized with dealer account logos and graphics for those vehicle purchasers associated with a dealer so that the dealer can have a continuing interaction with the vehicle purchaser. The in-vehicle unit performs a passive smart phone proximity sensing routine using Bluetooth® to authenticate and maintain connection with the user's smart phone. There is a periodic exchange of information between the in-vehicle unit and the app running on the user's smart phone. Depending on security requirement, some information is passed in open format, and some as an encrypted block. There are also data compression and filtering of collected data. The in-vehicle unit provides intermediate storage to allow short-term driving without the Smartphone being present.

In the parked state 730 one of the two main operational states of the in-vehicle module 108 while in owner mode. This state corresponds to the time between engine run sessions. In this state the OBDII subsystem of the in-vehicle unit 108 is in sleep mode to lower power consumption, but it is configured to wake up upon engine start (ignition on). This is monitored by the in-vehicle unit's 108 power management system 203. Upon entering the parked state 730 the in-vehicle module 108 captures data on a set of parameters comprising the end of the trip info (ETI) and provides the data to the bus data logger 212. ETI may consist of odometer reading, GPS position, VIN and others. The ETI is transmitted to the smart phone 109 and stored within the logger memory 212 of the in-vehicle unit 108.

There are two entry transitions to the parked state: 1) from the boot state 720, when the phone is detected, and 2) when the ETI is restored from persistent storage 710. While within the parked state 730, the OBDII subsystem of the in-vehicle module 108 is switched to command mode only. In parked state 730 the subsystem is generally in a dormant state and does not perform any monitoring of the OBDII buses except for ignition signal/message. The OBDII subsystem will also wake up to perform any action directed by the user command via Bluetooth® subsystem either actively or passively. The Bluetooth® subsystem 207 remains active and switches into a dual mode: communication and proximity sensing. Communication mode is used for receiving user commands from phone (e.g. lock/unlock, sleep, etc.). The proximity sensing logic may be solely located in the phone app, in the in-vehicle module, or split between in-vehicle module and the phone app. In all cases, the power of the Bluetooth® signal is reduced for the proximity sensing while it is maintained at high levels for communication purposes. To accommodate the two modes at the same time, the power of the Bluetooth® signal is modulated based on a predetermined schedule. The logic of proximity sensing as well as the details of the modulation of the signal power will be known to those of ordinary skill in the art.

The in-vehicle module motion sub-system 206 may be optionally reconfigured as a shock or tilt sensor; alternatively, it may be powered down. In the former case, the vehicle shock or tilt will result in an "extraordinary event" causing a notification 750 to be sent.

The driving state 740 is the other of the two main operational states of the in-vehicle module 108. It is the only state where the OBDII subsystem 211 is active. Upon entering the driving state 740, the in-vehicle module 108 collects the beginning of the trip info (BTI). BTI consist of the same parameters as ETI. BTI is transmitted to the user cell phone 109 for App usage and is also compared to ETI to determine the continuity of the in-vehicle module usage. In case of discrepancy, a notification 750 is created and transmitted to the system data base. The transition to the driving state 740 happens when the ignition is turned from off to on. The ETI is constructed from the current values of queried parameters. A copy of ETI is sent to the cell phone 109 for application consumption (e.g. drop parking pin). While within driving state 740, the Bluetooth® subsystem 207 is used solely to connect to the smart phone 109 as a conduit of information between a logger subsystem 212, phone 109 and application 105. The OBDII subsystem 211 monitors all applicable protocols available on data bus and performs relevant bus filtering to extract required information and to pass it to the logger subsystem 212 for processing.

The notification state 750 is the result of the abnormal transitions that require emergency notification. The abnormal transition may be caused by detection of the extraordinary condition via one of OBDII protocols (e.g. airbag deployment), internal monitoring (e.g. high level acceleration) or external power loss. In this state the internal power source is switched on to power the notification operation 750 and preservation of the internal storage. Upon completion of the task, in-vehicle transitions to storage state 710.

There are a number of other subroutines programmed within the in-vehicle unit 108. The house-keeping subsystem part of the power management system 203 and is mainly responsible for internal state management as well as power management. It determines the state transitions and its validity and configures other subsystems accordingly. In case there is more than one microcontroller within in-vehicle module, this subsystem is responsible for intra microcontroller communications. In case the in-vehicle module is installed as part of VESA system, the house-keeping subsystem is responsible for data bus communications and publishing relevant info on the bus.

The motion subsystem 213 fulfils different functions depending on the state of the in-vehicle module 108. In parked state 730 the motion subsystem 213 is configured as a shock/tilt sensor and monitors for abnormal behaviour. The details of the monitoring logic are similar to the data bus shock/tilt sensor and are known in the art. In driving state the motion subsystem is responsible for providing the periodic measurements of acceleration to the logger subsystem 212. Further processing of the measurements is left to logger subsystem 212. The motion subsystem 213 is also configured to detect sudden high magnitude acceleration. Detection of such event signals to the house-keeping and logger subsystems an extraordinary condition.

Bluetooth® subsystem 207 is always used to communicate with the phone 108 or hand held unit 107; however, the nature of the communication depends on the in-vehicle module state 700. In notification state 750 the Bluetooth® subsystem has only one responsibility: to communicate the notification to the phone 109. Upon receiving the confirmation of the delivery or losing the connection, Bluetooth® subsystem 207 notifies the house-keeping subsystem 203 of the completion of the task, allowing transition out of notification state 750. In driving state 740 the Bluetooth® subsystem 207 is responsible for providing the bidirectional communication between phone 109 and the logger subsystem 212. In parked state 730 the Bluetooth subsystem 207 is responsible for transferring commands from phone 109 and OBDII subsystem 211. It may also generate one of a number of commands depending on the proximity of the phone 109. In boot state Bluetooth® subsystem 207 may be used to transfer/receive configuration information for in-vehicle module 108.

The OBDII subsystem 207 is the filter between the in-vehicle module 108 and the vehicle. It is used to provide consistent interface in order to extract the predefined set of information from the vehicle buses and to convey it in the standard form to other subsystems. The information of interest may be available on different buses or/and in different formats depending on the vehicle model, year, trim. The OBDII subsystem 207 abstracts all those differences. In order to do so, it is configured at initial setup based on the VIN and configuration information obtained from Bluetooth® connection. Collection of the information gathered from OBDII protocols may vary, but it does include the static info such as VIN that is used to verify continuity of the device usage and immediate variable information such as engine RPM, vehicle speed, battery voltage, etc.

The logger subsystem 212 is predominantly active during driving state 740. It communicates with phone 109 app and data base via Bluetooth® subsystem 207. It should be noted that all communications with data base are encrypted and authenticated. The phone 109 is treated as unsecure medium for such communications, however, in all direct communications the phone 109 is considered to be a secure cell network with communications being encrypted. The logger subsystem 212 maintains two buffers of information: one short-term frequently updated buffer (STB) and one longer-term log (LTL). In normal operation, the logger subsystem 212 fills the STB with immediate vehicle data from OBDII subsystem 211, accelerometer readings (optionally—orientation readings from gyroscopes) from the motion subsystem 213, and GPS and time of the day info queried from phone 109 on a relatively frequent basis ~10 Hz. The size of the STB allows it to keep ~10 sec of data in the circular FIFO manner. Every 10 sec the STB buffer is analysed and compressed into single entry in LTL. The compression is based on eliminating non-interesting information (e.g. only mean and maximum acceleration is stored), however, the exact details of the compression are outside of the scope of this document. The size of the LTL is such as to allow up to 2-3 weeks of data to be stored. Once in a while, the logger subsystem 212 sends the oldest portion of the LTL to the data base 103 in encrypted form. Upon receiving an authenticated confirmation from data base 103, that portion of LTL is deleted, freeing space for more new data. The phone 109 may use additional logic to defer the transfer of the block of data (opaque from the phone's point of view) to data base based on additional logic (e.g. data plan management), thus the data is considered "delivered" only upon the receipt of confirmation from the data base. In case the confirmation of delivery from the data base arrives after the logger subsystem 212 has run out of space that event is recorded in LTL, the phone app is notified, and some of the older LTL is deleted (possibly, a portion of the older data is decimated to reduce the occupied space).

As mentioned above, aside from housing the user interface application in the owner mode, the user smart phone 109 fulfils two primary roles. The first is to provide the time of the day and GPS information, and the second is to provide the communication channel between in-vehicle module 108 and data base 103 during owner mode. The vehicle may be driven without the phone 109 present. In this case, the in-vehicle module 108 will rely on its internal clock for time keeping. While less accurate, it is deemed to be sufficiently precise for a not too prolonged period of time (2-3 weeks). Since the STB and LTL records contain a flag indicating the absence of the phone 109, clock info, the back-fill correction mechanism may be implemented to correct time info in past records when the phone 109 is reconnected and the timing discrepancy between it and in-vehicle internal clock is measured. The absence of GPS data is irresolvable and leads to a degraded data set. Absence of the phone 109 is less critical for the communication between application and in-vehicle module 108 since the system is designed to withstand communication blackouts. The duration of the maximum non-critical blackout is determined by the LTL size, currently assumed 2 weeks. The tolerance to blackout can be increased by increasing the LTL size without any additional change to the system.

In an alternative embodiment the in-vehicle module 108 may be deployed as part of the security or entertainment system. In this case it is possible that GPS and time information may be supplied by other nodes of the system via data bus. That will reduce the role of the Bluetooth® subsystem 207 only to phone proximity detection. It is also possible that proximity function is fulfilled by some other node as well. In this case the Bluetooth® subsystem 207 is redundant. The in-vehicle module 108 may (if configured) publish the information obtained from data bus for consumption by other nodes. Depending on configuration, the in-vehicle module 108 may publish info in parallel to storing it in STB or in LTL. It may also publish the state of phone proximity. The in-vehicle module 108 shall only implement data bus node functionality and shall not implement data bus root functionality, yet the in-vehicle module 108 is not a data bus terminal node and it shall implement two data bus connectors for chaining with other data bus nodes.

It in envisioned that the hand held unit 107 may be executed in alternative embodiments. In one embodiment, the hand held unit 107 is a dedicated piece of hardware issued to a dealership employee and is similar in appearance to a standard fob. In another embodiment, the hand held 107 unit can be in the form of a phone app, where the employee downloads a phone app to his or her personal phone and the app is configured with the dealer version of the user interface to set up permissions and vehicle access authorizations. When using the hand held unit 107, the employee can access detailed information about vehicles on the lot, including trim levels, pricing, warranty information, vehicle history, and sales promotions associated with the vehicle, etc. These data points assist the employee by making readily available all pertinent information about the vehicle.

When in dealer mode, the in-vehicle module 108 will recognize, through the Bluetooth® subroutine 207, that an authorized hand held unit is within proximity and it will allow those functions that are authorized by the account administrator. The in-vehicle module 108 will capture various data points regarding the employees interaction with the vehicle, such as time and duration doors are unlocked, whether the vehicle has been started or driven, including distance and GPS. The dealer can then associate these data points with other transactional information, such as whether a sale was closed, what aftermarket upgrades were sold, who the sales person was, and other data of interest. This information can be correlated to improve efficiencies and sales opportunities. The dealership can also use this data to monitor and locate inventory with ease.

When in owner mode, data related to vehicle operations and driving preference are collected by the in-vehicle module 108 and uploaded via Bluetooth® to the owner's version of the user interface residing on the user's phone 109. The phone 109 then transfers the data to the database 103 via the cell network. The consumer can then opt-in to notifications from the dealership. The notifications can present coupons for oil changes, tune ups, vehicle maintenance, birthday cards, free car washes, sales promotion, collision notification, geofence notifications, etc. Consumers can receive driving history for users of the vehicle, track service history, concierge services, roadside assistance and other valuable services. The system 100 uses this data to send targeted ads to the consumer via the phone app.

The system will use the phones 109 GPS coordinates to determine if the phone 109 is within proximity of a local business. If the local business has provided the dealership authority, the dealership will automatically send a notification regarding the business which could include a special or coupon. The dealership can also sell ad space to local businesses for those consumers that frequent the proximate location of the local business. For example, a manufacture of detergent may purchase ads for minivan owners within 1000 feet of major retailers. When an app user meets this criterion an ad is sent via the notification subroutine. It is contemplated that the dealer or the application host will offer for sale to local businesses ads and other marketing materials to be used in notifications.

Additionally, the phone can be used as a passive keyless entry system. The in-vehicle module can detect using the Bluetooth® proximity detection capability that the phone 109 is within range and then send a signal via the data bus to unlock the vehicle doors.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. The present invention thus can be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A management system for managing a plurality of vehicles, the management system comprising:
a first processor associated with a memory for storing instructions, and a database server storing staff user accounts, vehicle owner accounts, and vehicle accounts for the plurality of vehicles, the first processor accessible through the internet;
the staff user accounts providing for entry of staff user identification data and configuring a plurality of user access authorization levels for vehicles associated with the vehicle accounts, said access authorization levels providing permissions for vehicle door locks, ignition start and device configurations;
the vehicle owner accounts providing for vehicle owner identification and transaction data associated with sales of the vehicles;
the vehicle accounts providing for vehicle identification data and device configuration and vehicle location data;
a second data processor proximal to a car dealer lot of a car dealer, for providing secure access to said first processor and to configure within the database server the staff user accounts, the vehicle owner accounts and the vehicle accounts;
a plurality of handheld modules configured for wireless communication with the second data processor, each handheld module of said plurality of handheld modules being associated with a unique staff user account of the staff user accounts, wherein said each handheld module is capable of receiving and displaying data from the second data processor related to vehicle characteristics and the location of a vehicle of the plurality of vehicles matching said vehicle characteristics, and said each handheld module is capable of wirelessly receiving from the second data processor user access authorizations associated with the staff user account associated with said each handheld module; and
a plurality of vehicle installed modules installed in the plurality of vehicles, a vehicle installed module of the plurality of vehicle installed modules being installed in and associated with a vehicle of the plurality of vehicles, one vehicle installed module of the plurality of vehicle installed modules per vehicle of the plurality of vehicles at a time, each respective vehicle installed module of the plurality of vehicle installed modules having a memory and being in communication with the vehicle data bus system of the vehicle in which said each respective vehicle installed module is installed, said each respective vehicle installed module having a first operating mode for managing the vehicle in which said each respective vehicle installed module is installed on the car dealer lot before sale of the vehicle in which said each respective vehicle installed module is installed by the car dealer, and a second operating mode for communicating after the sale, wherein when said each respective vehicle installed module is in said first operating mode, said each respective vehicle installed module is in wireless communication with the second data processor and is configured to communicate wirelessly with the plurality of handheld modules, said each respective vehicle installed module providing access to at least one item selected from the group consisting of door locks of the vehicle in which said each respective vehicle installed module is installed, ignition system of the vehicle in which said each respective vehicle installed module is installed, and device configuration system of the vehicle in which said each respective vehicle installed module is installed if a proper authorization signal is received by said each respective vehicle installed module from a handheld module of the plurality of handheld modules matching an authorization configuration provided by the second data processor, and wherein further when in said first operating mode said each respective vehicle installed module wirelessly communicates vehicle location data to the second data processor, and when said each respective vehicle installed module is placed in said second operating mode, the first operating mode is permanently disabled in said each respective vehicle installed module and said each respective vehicle installed module collects vehicle performance data from the vehicle data bus of the vehicle in which said each respective vehicle installed module is installed and wirelessly communicates the vehicle performance data to the first processor through an uplink from a cellphone.

2. The management system according to claim 1, wherein said each respective vehicle installed module of the plurality of vehicle installed modules is configured to communicate wirelessly with the second data processor directly and using radio frequency (RF) relaying through other vehicle installed modules of the plurality of vehicle installed modules.

3. The management system according to claim 1, wherein said each respective vehicle installed module is configured to obtain Global Positioning System (GPS) data from GPS capability contained in the vehicle in which said each respective vehicle installed module is installed and transmit the GPS data to a wireless communication hub connected to the second data processor.

4. The management system according to claim 1, wherein:
said each respective vehicle installed module is configured to communicate with a Bluetooth®-enabled handheld module of the plurality of handheld modules using Bluetooth® communication standard, and to respond to location queries made by the Bluetooth®-enabled handheld module using the Bluetooth® communication standard; and
the Bluetooth®-enabled handheld module is configured to transmit Global Positioning System (GPS) location data of the Bluetooth®-enabled handheld module to the second data processor in response to Bluetooth® communication between said each respective vehicle installed module and the Bluetooth®-enabled handheld module, whereby the second data processor has access to the GPS location data of the Bluetooth®-enabled handheld module when the Bluetooth®-enabled handheld module is in proximity of the vehicle in which said each respective vehicle installed module is installed.

5. The management system according to claim 1, wherein at least one handheld module of the plurality of handheld modules comprises a smart phone application.

6. The management system according to claim 1, wherein the vehicle characteristics include make, model, year, trim level, and price.

7. A management system for managing a plurality of vehicles on a lot of a car dealer, the management system comprising:
a first computer system comprising a database server storing staff user accounts of staff users of the car dealer, vehicle owner accounts of buyers of the vehicles, and vehicle accounts of the plurality of vehicles, the first computer system being accessible through a network;
a second computer system configured to provide secure access to the first computer system and to enable configuring within the database server of the staff user accounts, the vehicle owner accounts, and the vehicle accounts;
a plurality of handheld units, each handheld unit of the plurality of handheld units being configured for wireless communications with the second computer system, said each handheld unit of the plurality of handheld units being associated with a unique staff user account of the staff user accounts; and
a plurality of modules installed in the plurality of vehicles, one module of the plurality of modules per vehicle of the plurality of vehicles, each module of the plurality of modules being in communication with a vehicle data bus system of the vehicle in which said each module is installed; wherein:
the staff user accounts comprise staff user identification data and a plurality of user access authorization levels for the plurality of vehicles, the access authorization levels providing permissions for vehicle door locks, ignition start, and feature configurations of the plurality of vehicles;
the vehicle owner accounts comprise vehicle owner identifications and transaction data associated with sales of the vehicles of the plurality of vehicles;
the vehicle accounts comprise vehicle identification data of the plurality of vehicles, the feature configurations of the plurality of vehicles, and vehicle location data of the plurality of vehicles;
said each handheld unit is configured to
send wirelessly to the second computer system one or more vehicle criteria inputted into said each handheld unit,
receive wirelessly from the second computer system location of a vehicle of the plurality of vehicles matching the one or more vehicle criteria and one or more user access authorizations for accessing the vehicle matching the one or more vehicle criteria using said each handheld unit;
said each module has a first operating mode for managing the vehicle in which said each module is installed on the lot before sale of the vehicle in which said each module is installed, and a second operating mode for communicating after sale by the car dealer of the vehicle in which said each module is installed;
when said each module is in the first operating mode,
said each module is configured to communicate wirelessly with the second computer system and to communicate wirelessly with the plurality of handheld units,
said each module is further configured to provide access to at least one item selected from the group consisting of door locks of the vehicle in which said each module is installed, ignition system of the vehicle in which said each module is installed, and device configuration system of the vehicle in which said each module is installed, if a proper authorization signal is received by said each module from a handheld unit of the plurality of handheld units matching an authorization configuration provided to said each module by the second computer system, and
said each module is further configured to communicate wirelessly vehicle location data to the second computer system; and
when said each module is placed in the second operating mode, the first operating mode is permanently disabled in said each module and said each module collects vehicle performance data from the vehicle data bus of the vehicle in which said each module is installed and communicates through a cellphone the vehicle performance data to the first computer system.

8. The management system according to claim 7, wherein when said each module is in the second operating mode, said each module further collects driving behavior and history data from the vehicle data bus of the vehicle in which said each module is installed and communicates through the cellphone the driving behavior and history data to the first computer system.

9. The management system according to claim 7, wherein when said each module is in the second operating mode, said each module is configured to send one or more notifications.

10. The management system according to claim 9, wherein the one or more notifications comprise extraordinary event notifications caused by vehicle shock or tilt.

11. The management system according to claim 7, wherein when said each module is in the second operating mode, the module is further configured to detect the cellphone using proximity detection capability and unlock doors of the vehicle in which the module is installed in response to detection of the cellphone.

12. The management system according to claim 7, wherein when said each module is in the second operating mode, the module is further configured to detect the cellphone using Bluetooth® proximity detection capability and unlock doors of the vehicle in which the module is installed in response to detection of the cellphone.

13. The management system according to claim 7, wherein said each handheld unit comprises a smart phone application.

14. The management system according to claim 7, wherein said each handheld unit comprises a dedicated piece of hardware.

15. The management system according to claim 7, wherein said each module comprises a short term data buffer for buffering the vehicle performance data over a period of less than about ten seconds and a longer-term log buffer, wherein said each module is further configured periodically to compress the vehicle performance data in the short term buffer and store the compressed vehicle performance data in the longer-term log buffer.

16. The management system according to claim 15, wherein the longer-term data buffer is sufficient to store the compressed vehicle performance data accumulated during two weeks of driving.

17. The management system according to claim 7, wherein said each module is configured to communicate wirelessly with the second computer system directly and using radio frequency (RF) relaying through other modules of the plurality of modules.

18. The management system according to claim 7, wherein the one or more vehicle criteria comprise at least one criterion selected from the group consisting of vehicle make, vehicle model, vehicle year, vehicle trim level, and vehicle price.

\* \* \* \* \*